United States Patent
Kawai et al.

(10) Patent No.: US 6,947,501 B2
(45) Date of Patent: Sep. 20, 2005

(54) DECODER DEVICE FOR DECODING PACKET SIGNALS COMPOSED OF CONTROL CODES AND DATA CODES

(75) Inventors: Shigeki Kawai, Yokohama (JP); Manabu Sawada, Yokohama (JP); Kunihiko Sasaki, Kuwana (JP)

(73) Assignee: Denso Corporation, Kariya (JP)

(*) Notice: Subject to any disclaimer, the term of this patent is extended or adjusted under 35 U.S.C. 154(b) by 797 days.

(21) Appl. No.: 09/867,727

(22) Filed: May 29, 2001

(65) Prior Publication Data

US 2001/0047268 A1 Nov. 29, 2001

(30) Foreign Application Priority Data

May 29, 2000 (JP) ........................................ 2000-158442

(51) Int. Cl.[7] .................... H04L 27/06; G10L 21/00; G01S 1/24
(52) U.S. Cl. .................... 375/340; 704/500; 342/387
(58) Field of Search .................... 375/340, 225; 704/500; 342/387; 370/347

(56) References Cited

U.S. PATENT DOCUMENTS

| | | | | |
|---|---|---|---|---|
| 5,327,127 A | * | 7/1994 | May et al. | 341/102 |
| 5,678,173 A | | 10/1997 | Mihara | |
| 5,729,526 A | * | 3/1998 | Yoshida | 370/206 |
| 5,774,496 A | * | 6/1998 | Butler et al. | 375/225 |
| 6,111,912 A | * | 8/2000 | Cohen et al. | 375/225 |
| 6,182,261 B1 | * | 1/2001 | Haller et al. | 714/758 |
| 6,252,917 B1 | * | 6/2001 | Freeman | 375/340 |
| 6,256,072 B1 | * | 7/2001 | Bae et al. | 348/568 |
| 6,289,000 B1 | * | 9/2001 | Yonge, III | 370/203 |

FOREIGN PATENT DOCUMENTS

| | | |
|---|---|---|
| JP | 7-123017 | 5/1995 |
| JP | 7-312748 | 11/1995 |
| JP | 9-321813 | 12/1997 |

OTHER PUBLICATIONS

IEEE Standard 802.11a–1999, pp. 35–37.*
Notice of Rejection dated May 18, 2004 in Japanese Application No. 2000–158442.

* cited by examiner

Primary Examiner—Amanda Le
Assistant Examiner—Cicely Ware
(74) Attorney, Agent, or Firm—Harness, Dickey & Pierce, PLC

(57) ABSTRACT

A packet signal, formed according to an orthogonal frequency division multiplexing (OFDM) format, received by a receiver is decoded in a decoder device of the receiver. The packet signal includes a data code and a control code having a formula for decoding the data code. The control code is first decoded and analyzed to obtain the decoding formula contained therein. The data code is decoded during a period in which the control code is being analyzed, based on plural decoding formulae one of which coincides with the decoding formula contained in the control code. Data signals decoded based on the respective decoding formulae are sent to an output selector together with the decoding formula obtained from the control code. The output selector selects a data signal which is decoded based on a decoding formula that coincides with the decoding formula obtained from the control code.

4 Claims, 3 Drawing Sheets

DECODER DEVICE FOR DECODING PACKET SIGNALS COMPOSED OF CONTROL CODES AND DATA CODES

CROSS-REFERENCE TO RELATED APPLICATION

This application is based upon and claims benefit of priority of Japanese Patent Application No. 2000-158442 filed on May 29, 2000, the content of which is incorporated herein by reference.

BACKGROUND OF THE INVENTION

1. Field of the Invention

The present invention relates to a decoder device for use in a receiver for decoding packet signals that include data codes and control codes.

2. Description of Related Art

The IEEE-802.11a standard requires that a header of a packet signal should include control codes containing information for decoding the packet signal. The decoding information consists of a modulation formula (QPSK, BPSK, 16-QAM or 64-QAM) and a coding rate (½ or ¾) of an error correction code. The packet signals received by a receiver are divided into data codes and control codes, and the control codes are first decoded and analyzed to determine which one of the modulation formulae and which one of the coding rates are specified in the control codes as the decoding information. Since it is predetermined that the control codes themselves are coded under the modulation formula BPSK and the coding rate ½, the control codes can be decoded based on the BPSK and the coding rate ½. After the decoding information is detected, the data codes are decoded based on the detected decoding information.

The decoding is performed using a Viterbi decoder. Since the decoding process performed by the V-terbi decoder is relatively slow, it takes a long time to process the packet signal as a whole, if the data codes are decoded based on the decoding information after it is obtained by decoding and analyzing the control codes. A real time decoding is not possible.

SUMMARY OF THE INVENTION

The present invention has been made in view of the above-mentioned problem, and an object of the present invention is to provide an improved decoder device in which the time required for decoding is shortened, thereby realizing real time processing.

Packet signals that include control codes and data codes structured in an orthogonal frequency division multiplexing (OFDM) format are received by a receiver such as a mobile receiver and decoded in a decoder device of the receiver. The control codes include a decoding formula consisting of a modulation formula and a coding rate as information for decoding the data codes. The decoder device is composed of a divider such as a decomposite circuit, plural decoders and an output selector.

The divider divides out the control code and the data code included in the packet signal and feeds those codes to the decoders. One of the decoders decodes the control code, and the decoded control code is analyzed to obtain the decoding formula contained in the control code. During a period in which the decoded control code is being analyzed, the data code is decoded in the plural decoders based on respective decoding formulae which are preset in the respective decoders. A decoding formula preset in one of the decoders coincides with the decoding formula included in the control code.

The decoding formula obtained from the control code and all the data signals decoded in the respective decoders are fed to the output selector. The output selector selects a data signal, from among the plural data signals, that is decoded based on a decoding formula which coincides with the decoding formula obtained from the control code. Each decoder is composed of a modulator, a de-interleaver and a Viterbi decoder. The decoder device, however, may be structured to use those components commonly in the plural decoders.

Since the data code is decoded in the period during which the control code is being analyzed, the time required for decoding the packet signal is shortened, and thereby a real time processing is realized.

Other objects and features of the present invention will become more readily apparent from a better understanding of the preferred embodiments described below with reference to the following drawings.

DETAILED DESCRIPTION OF THE PREFERRED EMBODIMENTS

Figure 1:
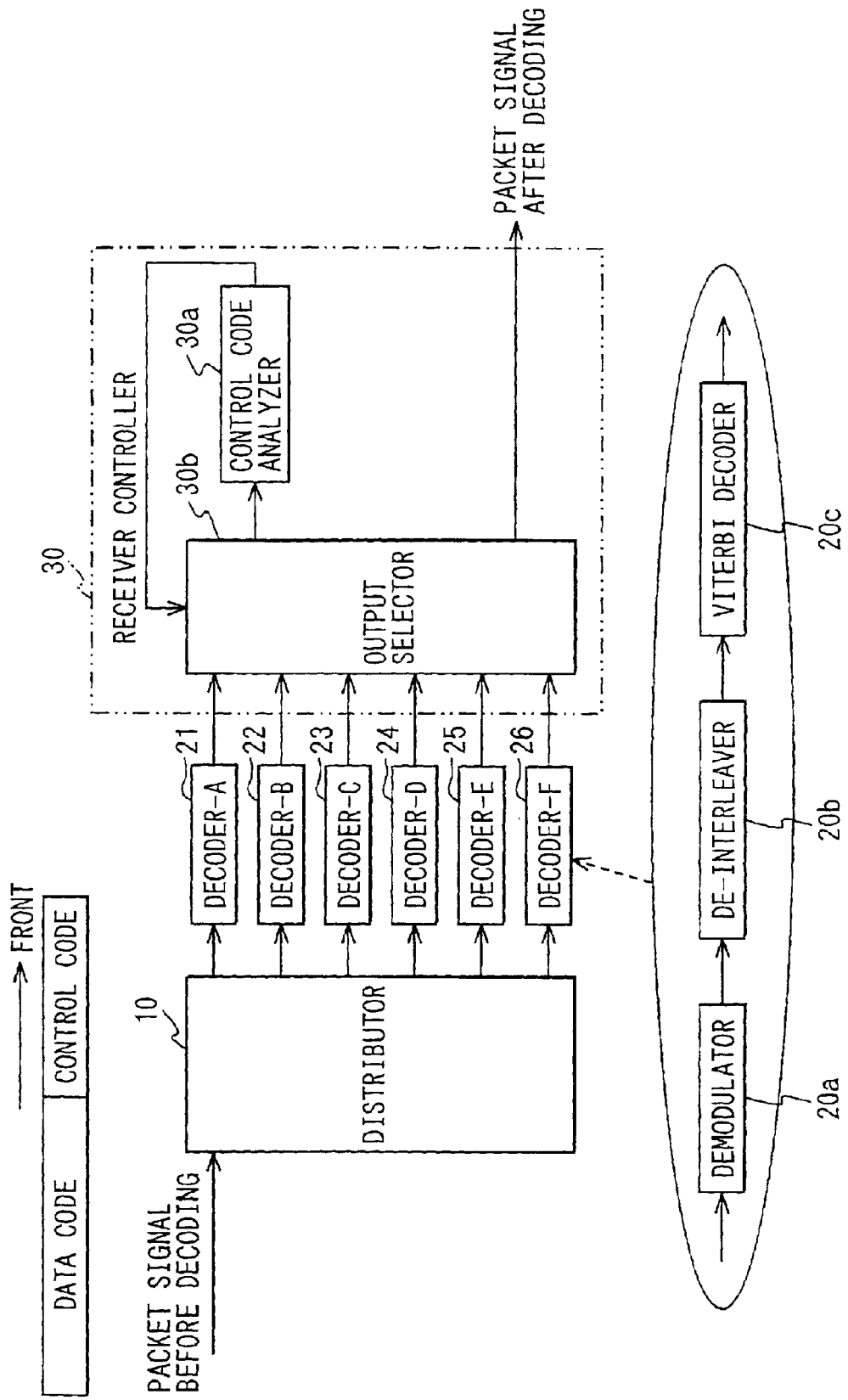
FIG. 1 is a block diagram showing a structure of a decoder device as a first embodiment of the present invention.

A first embodiment of the present invention will be described with reference to FIG. 1. The decoding device shown in FIG. 1 is a decoding device used in a receiver which receives packet signals using the orthogonal frequency division multiplexing (OFDM) format for MMAC. A base band signal, the amplitude and phase of which are adjusted is fed into the decoder device as a packet signal through an antenna, a receiving circuit, a fast Fourier transform (FFT) processor, an equalizer and so on (those components are not shown in FIG. 1). The packet signal is composed of control codes and data codes which are fed to the decoder device in this order.

The packet signal is distributed to decoders 21–26 (six decoders, decoder-A, decoder-B, decoder-C, decoder-D, decoder-E and decoder-F are used in this particular embodiment) through a distributor (a decomposite circuit) 10. The decoder-A 21 is used for decoding both of the control codes and the data codes, and other decoders 22–26 are used for decoding the data codes. The distributor 10 divides out the control codes from the packet signal and feeds the control codes to the decoder-A 21. Then, the data codes are fed to all the decoders 21–26.

As shown in FIG. 1, each decoder 21–26 is composed of a demodulator 20a, a de-interleaver 20b and a Viterbi decoder 20c. The demodulator 20a and the de-interleaver 20b process the codes fed thereto under either one of the modulation formulae, QPSK, BPSK or 16-QAM. The Viterbi decoder 20c decodes the codes under one of the coding rates, ½ or ¾. More particularly, the decoder-A 21 is set to decode under the modulation formula BPSK and the coding rate ½; the decoder-B 22 under BPSK and ¾; the decoder-C 23 under QPSK and ½; the decoder-D 24 under QPSK and ¾; the decoder-E 25 under 16-QAM and ½; and the decoder-F 26 under 16-QAM and ¾. The demodulators 20a, de-interleavers 20b and Viterbi decoders 20c in the respective decoders 21–26 are structured to operate in the above manner.

The control codes are first decoded by the decoder-A 21, and then, the data codes are decoded by the decoders 21–26. All the signals decoded by the respective decoders 21–26 are fed to an output selector 30b in a receiver controller 30. The signals decoded by the decoder-A 21 is further fed to a control code analyzer 30a in the receiver controller 30. The control code analyzer 30a analyzes the decoded control codes fed thereto and determines the modulation formula and the coding rate contained in the control codes as information for decoding the data codes. The output selector 30b selects a decoded data signal, from among decoded data signals fed from the respective decoders 21–26, which is decoded based on the decoding information (the modulation formula and the coding rate) determined by the control code analyzer 30a. The selected decoded data signal is outputted from the output selector 30b as a decoded packet signal.

Figure 2:
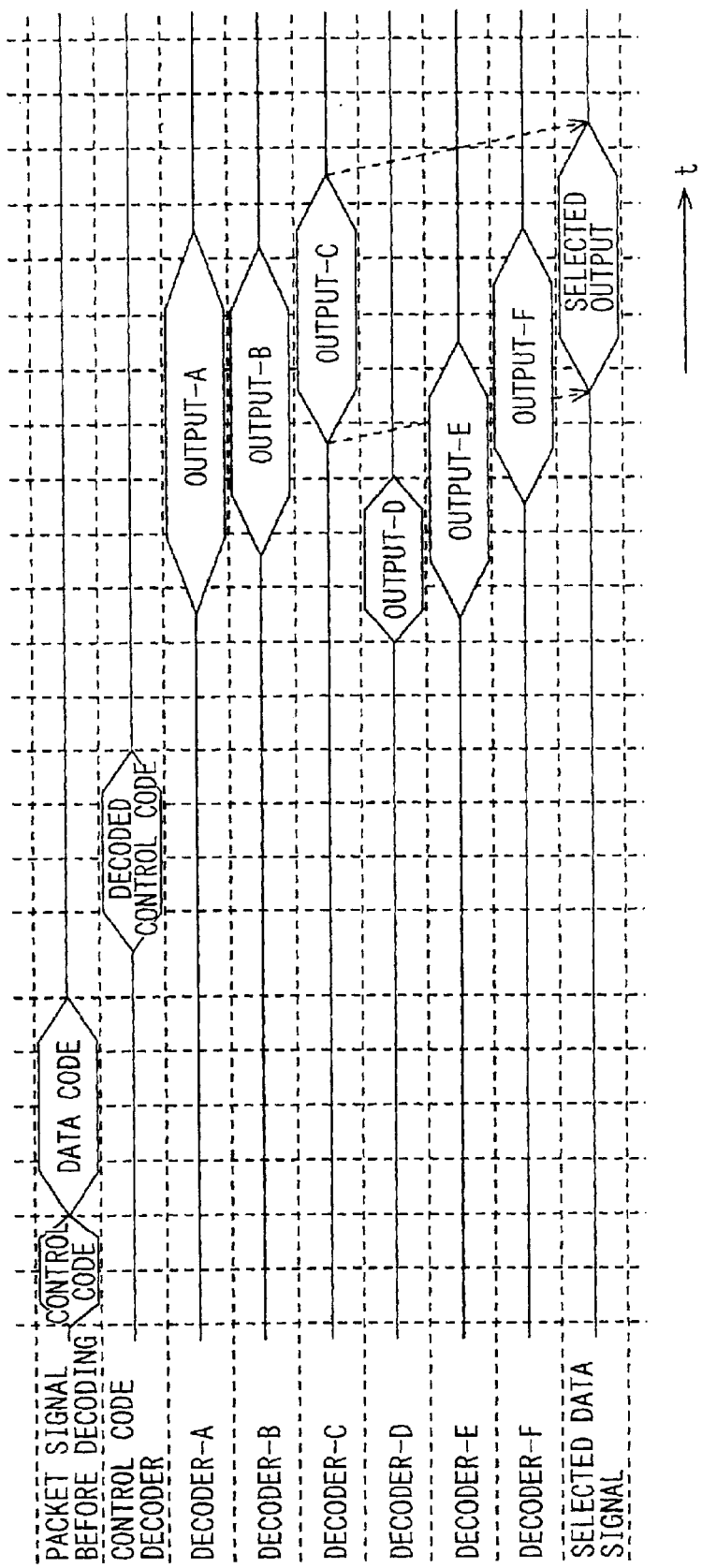
FIG. 2 is a timing chart showing operation of the decoder device shown in FIG. 1.

Referring to FIG. 2, timing of the process performed in the decoder device will be explained. The control codes and the data codes included in the packet signal are fed to the decoder device in this order. First, the control codes are decoded by the decoder-A 21, and the decoded control codes are outputted. Then, the data signal outputs A–F decoded by respective decoders 21–26 are outputted. Since a period of time required to decode the data codes in the respective decoders 21–26 is not all the same, the output timing of the decoded data is somewhat different from one another. However, the decoder device is structured so that the fastest decoded data output appears after the decoded control code is outputted. The decoded control code is analyzed to determine the decoding information contained therein, while the data codes are being decoded.

A decoded data output that is decoded based on a modulation formula and a coding rate, both coinciding with those obtained by analyzing the decoded control codes, is selected from among the decoded data outputs A–F and outputted from the output selector 30b. FIG. 2 shows an exemplary situation where the decoded data output C is selected. As explained above, the decoding process time is shortened because the data codes are decoded while the decoded control code is analyzed, thereby realizing a real time process of the packet signal fed to the decoder device.

A second embodiment of the present invention will be described with reference to FIG. 3. In the first embodiment described above, the decoders 21–26 are arranged all in parallel. In the second embodiment, components are used commonly to plural decoders. The decoder device as the second embodiment is composed of a distributor (a decomposite circuit) 100, demodulators 201–204, de-interleavers 205–208, an OR-circuit 209, dummy bit inserters 210–212, and decoders 213–218. A frequency shown in parentheses in each decoder 213–218 is a clock frequency under which each decoder operates.

The distributor 100 divides the packet signal fed to the decoder device into the control code and the data code, and feeds the control code to the demodulator 201 and the data code to the demodulators 202–204. Since the packet signal before decoding is a base band signal having the OFDM format, it is possible to cutout the packet signal into 4-bit signals to feed them to the demodulators 201–204 if the packet signal is a 12-bit signal.

The control fed to the demodulator 201 is demodulated therein under the BPSK modulation formula and is fed to the de-interleaver 205 which de-interleaves the demodulated signal. The de-interleaved signal is fed to the decoder 213 via the OR-circuit 209 and decoded therein. Thus, the control code decoded under the modulation formula BPSK and the coding rate ½ is obtained and fed to the receiver controller 30. The receiver controller 30 analyzes the decoded control code, in the same manner as in the first embodiment, to obtain the modulation formula and the coding rate contained therein as information for decoding the data code. The details of the receiver controller 30 are illustrated in FIG. 1.

The data code fed from the distributor 100 to the modulator 202 is demodulated under the 16-QAM modulation formula and is fed to the de-interleaver 206 that de-interleaves under the 16-QAM modulation formula. The de-interleaved signal is fed to the decoder 213 via the OR-circuit 209 and to the decoder 214 via the dummy bit inserter 210 that inserts a dummy bit into the de-interleaved signal. The decoder 213 outputs the data signal decoded under the 16-QAM and the ½ coding rate, while the decoder 214 outputs the data signal decoded under the 16-QAM and the ¾ coding rate.

The data code fed from the distributor 100 to the modulator 203 is demodulated under the QPSK modulation formula and is fed to the de-interleaver 207 that de-interleaves under the QPSK modulation formula. The de-interleaved signal is fed to the decoder 215 and to the decoder 216 via the dummy bit inserter 211 that inserts a dummy bit into the de-interleaved signal. The decoder 215 outputs the data signal decoded under the QPSK and the ½ coding rate, while the decoder 216 outputs the data signal decoded under the QFSK and the coding rate ¾.

Similarly, the data code fed from the distributor 100 to the modulator 204 is demodulated under the BPSK modulation formula and is fed to the de-interleaver 208 that de-interleaves under the BPSK modulation formula. The de-interleaved signal is fed to the decoder 217 and to the decoder 218 via the dummy bit inserter 212 that inserts a dummy bit into the de-interleaved signal. The decoder 217 outputs the data signal decoded under the BPSK and the ½ coding rate, while the decoder 218 outputs the data signal decoded under the BPSK and the coding rate ¾.

Thus, six decoded data signals which are respectively decoded under six combinations of three modulation formulae (16-QAM, QPSK and BPSK) and two coding rates (½ and ¾) are fed to the receiver controller 30. The receiver controller 30 outputs the data signal which is decoded under the decoding information (consisting of a modulation formula and a coding rate) which coincides with the decoding information obtained by analyzing the decoded control code. In other words, the receiver controller 30 selects one decoded data signal from among six decoded data signals and outputs the selected data signal as a decoded packet signal.

Since the data codes are decoded during a period in which the control code is analyzed in the same manner as in the first embodiment, the time required for the decoding process as a whole is shortened, and thereby the real time processing is realized.

It is necessary, in both of the foregoing embodiments, to output the decoded data signals after the analysis of the control code is completed. For this purpose, the decoded data signals may be temporality held in a memory such as a buffer until the control code analysis is completed, if such is necessary in a particular arrangement of the decoder device. For example, a buffer 219 (shown in FIG. 3 with a dotted line) may be disposed after the decoder 214. In the conventional decoder device, such buffers are always required to hold the decoded data signals because the decoded data signals are outputted during the analysis of the control code. However, in the present invention, the number of the buffers can be reduced if such buffers are necessary due to a particular structure of the decoder device.

Figure 3:
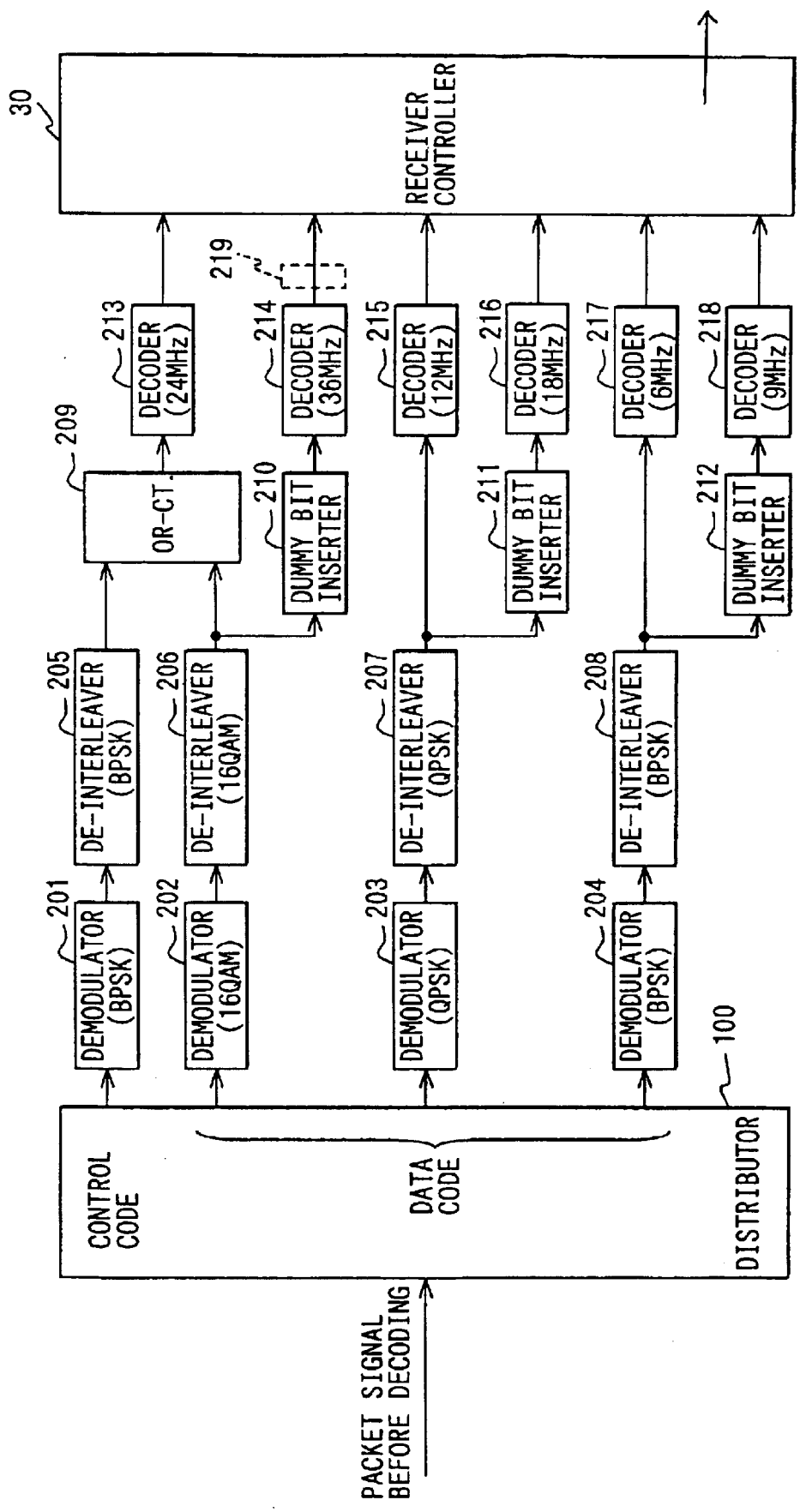
FIG. 3 is a block diagram showing a structure of a decoder device as a second embodiment of the present invention.

In the second embodiment shown in FIG. 3, a pair of decoders corresponding to each modulation formula is used to obtain two decoded signals decoded under two coding rates, ½ and ¾. To simplify the device, it is possible to use a single decoder corresponding to each modulation formula and to determine whether the de-interleaved signal goes through the dummy bit inserter or not according to coding rates instructed from the receiver controller 30. In this arrangement, buffers for storing the outputs from the de-interleavers until the data code analysis in the receiver controller 30 is completed are required, and accordingly the decoding process is not carried out in real time. However, because the process up to the de-interleavers can be carried out during the control code is being analyzed, the processing time as a whole is shortened compared with that in the conventional device.

The number of combinations of the modulation formulae and the coding rates is not limited to six, but it may be changed to other numbers according to communication systems. Further, the receiver is not limited to a mobile station, but it may be other stations such as a base terminal.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A decoder device for decoding packet signals composed of control codes and data codes, the control codes including a specified combination of a modulation formula and a coding rate for decoding the data codes, the decoder device comprising:

means for dividing the packet signals into the control codes and the data codes;

means for decoding the control codes and for decoding the data codes based on a plurality of combinations, each combination consists of a modulation formula and a coding rate, thereby generating a plurality of data signals decoded based on the respective combinations; and means for selecting a decoded data signal, from among the plurality of decoded data signals, that is decoded based on a combination which coincides with the specified combination included in the control codes, thereby outputting the selected data signal therefrom; wherein the decoding means includes: a plurality of demodulators, the number of which corresponds to the number of the modulation formulae; a plurality of de-interleavers, each connected to each demodulator; and a plurality of decoders for outputting decoded data signal outputs, each decoder outputting a plurality of decoded data signal outputs, the number of which corresponds to the number of coding rates.

2. A decoder device for decoding packet signals composed of control codes and data codes, the control codes including a specified combination of a modulation formula and a coding rate for decoding the data codes, the decoder device comprising:

means for dividing the packet signals into the control codes and the data codes;

means for decoding the control codes and for decoding the data codes based on a plurality of combinations, each combination consists of a modulation formula and a coding rate, thereby generating a plurality of data signals decoded based on the respective combinations; and means for selecting a decoded data signal, from among the plurality of decoded data signals, that is decoded based on a combination which coincides with the specified combination included in the control codes, thereby outputting the selected data signal therefrom; wherein the decoding means includes: first demodulating means for demodulating the control codes, and a second demodulating means for demodulating the data codes to output a plurality of demodulated outputs, the number of which corresponds to the number of modulation formulae; and the dividing means feeds the control codes to the first demodulating means and the data codes to the second demodulating means.

3. The decoder device as in claim 2 wherein:

the decoding means further includes first de-interleaver means connected to the first demodulating means, second de-interleaver means connected to the second demodulating means for outputting the same number of de-interleaved outputs as the number of the demodulated outputs from the second de-modulating means, and decoder means connected to the second de-interleaver means for outputting such a number of decoded outputs, for each de-interleaved output from the second de-interleaver means, that corresponds to the number of the coding rates; and a part of the decoder means is connected also to the first de-interleaver means for decoding the output from the first de-interleaver means.

4. A method of decoding a packet signal composed of a control code and a data code, the control code including a formula for decoding the data code, the method comprising:

dividing the packet signal into the control code and the data code;

decoding the control code into a decoded control code;

analyzing the decoded control code to obtain the formula for decoding the data code contained in the control code;

decoding the data code under a plurality of decoding formulae to obtain a plurality of decoded data signals while analyzing the decoded control code; and selecting a decoded data signal, from among the plurality of decoded data signals, that is decoded under a decoding formula which coincides with the decoding formula obtained from the control code.

* * * * *